Oct. 21, 1941.    R. G. AREY    2,259,985

PARKING METER

Filed July 23, 1940

Inventor:
Ralph G. Arey,
by Harry E. Dunham
His Attorney.

Patented Oct. 21, 1941

2,259,985

UNITED STATES PATENT OFFICE 2,259,985

PARKING METER

Ralph G. Arey, Swampscott, Mass., assignor to General Electric Company, a corporation of New York Application July 23, 1940, Serial No. 346,949

1 Claim. (Cl. 194—54)

My invention relates to coin-controlled time measurement meters and in particular parking meters.

A parking meter is a device employed to discourage the parking of automobiles for long periods of time on busy streets but which, upon the deposit of a coin, authorizes parking for a selected short time interval kept account of by the meter. When the legal parking time has elapsed, the meter so indicates.

The object of my invention is to provide a reliable and simple, low cost meter of this type.

The features of my invention which are believed to be novel and patentable will be pointed out in the claim appended hereto. For a better understanding of my invention, reference is made in the following description to the accompanying drawing which, in Fig. 1 illustrates a perspective view of my meter as assembled in its casing and Fig. 2 illustrates the coin-controlled timing mechanism thereof.

Figure 1:
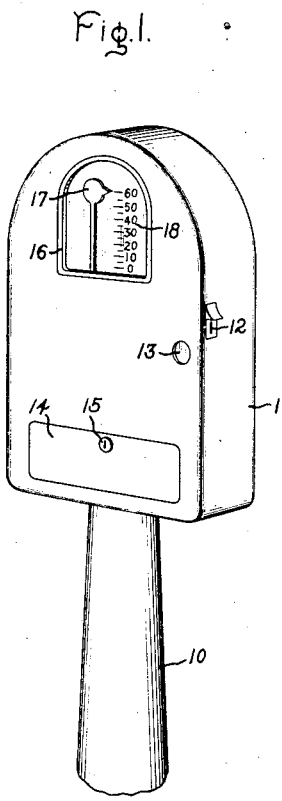

In Fig. 1, 10 represents a suitable standard by means of which my meter is to be supported adjacent the parking area. Where the meter is in part electrically operated such standard may be made hollow and contain the electric supply battery or supply wires. The meter is contained in a casing 11 having a coin slot 12, a coin observation window 13, a coin box 14 which may be locked as indicated by the key hole 15, and windows, one of which is shown at 16, exposing to view the time indicator 17 and the time scale 18. Another window and scale serving the same purpose as the one shown may be contained in the opposite side wall of the casing in order that the time indicating mechanism may be seen from opposite sides of the meter. As shown in Fig. 1, the time indicator is opposite the 60-minute graduation at the top of the scale indicating that a 60-minute parking time interval has just been paid for by the deposit of a coin. As this time expires, the indicator 17 will gradually move down the scale and indicate the remaining parking time paid for, and at the end of the 60-minute interval will indicate zero unless in the meantime another coin has been deposited.

Figure 2:
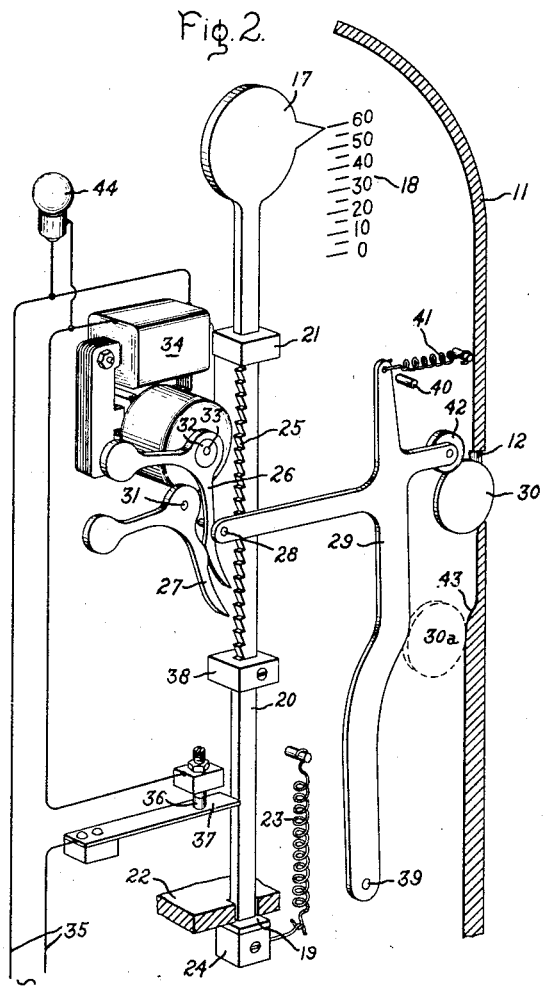

The mechanism for operating the indicator is illustrated in Fig. 2. The indicator 17 is on the upper end of a member 20 which is arranged to slide vertically in guides 21 and 22. The rod 20 is urged to move upwardly and in an upscale direction by a spring 23. A stop 24 on or near the lower end of the rod limits the extent of such upward movement by coming against guide 22 and the stop 24 is adjustable along the rod to adjust the device for different lengths of allowable parking time. The striking surface 19 of stop 24 may be of rubber or the like to absorb shock and decrease noise. As shown in Fig. 2, the stop 24 is adjusted so that the indicator 17 is opposite the 60-minute graduation of scale 18 when the rod 20 is in the uppermost position allowed by the adjustment of stop 24. The device is thus adjusted for a 60-minute parking time interval and to adjust for a 30-minute time interval, for example, the stop 24 would be loosened and rod 20 moved down to bring the indicator 17 opposite the 30-minute graduation of the scale 18 and the stop 24 again tightened, while in contact with guide member 22.

Rod 20 is also provided with ratchet teeth 25 over a part of its length on one side which cooperate with ratchet pawl 26 and a retaining stop pawl 27 to move the rod 20 downward against the tension of spring 23. These ratchet teeth have been shown somewhat enlarged and fewer in number as compared to the spacing of the time graduations at 18 than will actually be the case in practice in order that the ratchet mechanism might be more clearly pictured. The illustration of the principle is what is intended rather than preferred dimensions. In the illustration the pawls 26 and 27 are held away from the ratchet teeth on rod 20 by means of a finger 28 on an arm of a coin-actuated lever 29. This occurs when a coin 30 is pushed into coin slot 12, but at other times finger 28 is retracted and allows the tips of the pawls 27 and 28 to rest against the toothed surface of rod 20. The pawls are positioned one back of the other so that both are moved away by one finger 28.

The pawls are so pivoted and weighted as to swing into contact with the toothed surface when permitted to do so. The stop pawl is pivoted on a stationary pin 31 and pawl 26 is pivoted on an eccentric 32 secured to a shaft 33 of a timer motor 34. When the time motor is in operation the eccentric gives the pawl 26 an up and down reciprocating motion sufficient to move ratchet rod 20 downward. The spacing of the teeth 25 on rod 20 is such that the throw of the eccentric moves the rod 20 downward a corresponding distance for each ratcheting operation and the stop pawl 27 prevents the rod from following the pawl 26 in its upward or retracting movement.

The timer motor may be of any suitable type but I have represented it as being an electric clock motor of the self-starting synchronous type commonly used for timing purposes. This motor is energized from a source 35 through a switch 36 biased to a closed position by the spring contact arm 37. The arm 37 extends into the path of movement of a member 38 secured to rod 20 as the rod moves downward. The member 38 is so positioned on rack rod 20 as to move against resilient switch member 37 to open the switch when the indicator 17 registers with the zero time graduation on scale 18. It is thus seen that whenever the register has been driven to a zero time indicating position, the motor 34 is deenergized and it stops, otherwise it is energized and in operation.

The coin lever 29 referred to above is pivoted at 39 and is normally pulled to the right against a stop 40 by a spring 41 and when in such position the pin 28 is retracted and permits the pawls 26 and 27 to cooperate with the ratchet teeth on rod 20. However, when a coin 30 is pushed into slot 12, it contacts with a roller 42 secured to lever 29 and partially obstructing the coin slot opening and rotates rod 29 about its pivot 39 against the tension of spring 41 until the coin clears the obstructing roller 42 and drops downward. Thus the insertion of the proper coin moves the pawls 26 and 27 away from the toothed surface of rod 20 for an interval sufficient for the spring 23 to raise rod 20 to a position determined by the time setting of stop 24 and also closing switch 36, if open at the time the coin was deposited.

Following the deposit of a coin, as soon as such coin clears roller 42, the spring 41 moves coin lever 29 to the right again in time to catch the falling coin between the lever and an offset or projection 43 in the coin chute. The coin is thus caught at this second obstruction in the coin passageway and retained just above the projection 43 until another coin is deposited. This position of the coin is opposite the window 13 (see Fig. 1) where a police officer can see it and this is merely a feature of the device which discourages dishonest persons from using slugs or improper coins. When the next coin is deposited in coin chute 12, lever 29 upon being moved to the left releases the coin held at point 43 and it then falls downward into the coin box at 14. In dotted lines at 30a I have indicated a coin just being released and starting to fall. Below point 43 the clearance between lever 29, which forms one side of the coin chute, and the other edge of the chute widens out to allow the coin to drop freely.

I will now briefly review the operation of this device starting with the deposit of a coin and the positoin of the parts shown in Fig. 2. Coin 30, after being completely pushed into the slot, clears roller 42 and drops to point 43 where it is caught by the lever 29 which has now moved to the right against stop 40. Motor 34 is in operation and moves rod 20 downward tensioning spring 23. This continues for a 60-minute period or until another coin is deposited. If no more coins are deposited during this 60-minute period at the end of such period projection 38 opens switch 36 and stops the motor 34. At all times during such period indicator 17 indicates the remaining allowable parking time on scale 18. Nothing further happens until another coin is deposited. When this occurs, the coin caught at point 43 is released, pawls 26 and 27 are demeshed from the toothed rack of rod 20, spring 23 raises rod 20 until stop 24 comes against guide 22, and switch 36 is allowed to close. Coin lever 29 returns against stop 40, catching the falling coin at point 43 and allowing the pawls 27 and 28 to again mesh with the rack on rod 20. The motor 34 having been started, the rod 20 is lowered to measure the parking time period just paid for and the spring 23 is rewound.

Should a coin be deposited during such a timing operation and before the time paid for has expired, pawls 26 and 27 are released and the rod rises to full-time position. In such case the motor is not stopped but continues to operate, otherwise the operations are the same.

The switch 36 and the feature of stopping the timing motor are not essential to the successful operation of this device. I could allow the motor to run without doing any work when the indicator is in a zero time indicating position since the teeth 25 need not extend upward on rod 20 beyond the point necessary to lower such rod to the zero time-indicating position.

The time dial and indicator are preferably illuminated when in use by a lamp 44 connected in parallel with the motor through switch 36. Such illumination will also be of assistance to the patrol officer since he can detect it from a much greater distance than he can read the time dial. If a car is parked opposite a dark meter, the officer knows at once that it is illegally parked.

If a one-revolution per minute terminal speed timer motor is used at 34, there should be 60 teeth in the rack on rod 20 covering a distance equal to the length of a 60-minute scale at 18 and the throw of the pawl 26 should be slightly greater than the spacing of teeth 25. In such case the indicator 17 will be moved downward in steps once per minute which will give sufficiently accurate time indications for the purpose in question.

It is seen that this device is simple, rugged and inexpensive in construction. It has few parts and its operation is simple, yet it gives all necessary information required of such a device in a reliable manner.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

A coin controlled time meter comprising a casing having a coin slot opening and a coin-observation window beneath said opening, a coin passageway from said slot opening past said observation window, a movable time indicator in said casing having a toothed driving surface, time-controlled means, a pawl reciprocated by said means and biased to engage said toothed surface for moving said indicator in one direction, a retaining pawl adjacent the first mentioned pawl biased to engage said toothed surface, means for moving said indicator in the opposite direction when said pawls are disengaged from said toothed surface and a unitary lever movable within said casing having a part for disengaging said pawls, a part for partially obstructing the coin slot and a part for partially obstructing the coin passageway adjacent said observation window, said lever being normally biased to the coin-obstructing and pawl-engaging position and movable from said position by the insertion of a coin in said slot to disengage both pawls and clear the coin slot and coin passageway, said lever returning to its normal position in time to catch such coin where it may be observed in said observation window.

RALPH G. AREY.